United States Patent
Lukianov

(10) Patent No.: US 12,314,750 B2
(45) Date of Patent: May 27, 2025

(54) MIGRATING CONTAINERS ACROSS NON-UNIFORM MEMORY ACCESS (NUMA) NODES OF A PROCESSOR DEVICE

(71) Applicant: Red Hat, Inc., Raleigh, NC (US)

(72) Inventor: Artyom Lukianov, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 558 days.

(21) Appl. No.: 17/704,600

(22) Filed: Mar. 25, 2022

(65) Prior Publication Data
US 2023/0305874 A1    Sep. 28, 2023

(51) Int. Cl.
G06F 9/44     (2018.01)
G06F 9/455    (2018.01)
G06F 9/50     (2006.01)

(52) U.S. Cl.
CPC ........ G06F 9/45558 (2013.01); G06F 9/5016 (2013.01); G06F 9/5077 (2013.01); *G06F 2009/4557* (2013.01); *G06F 2009/45579* (2013.01); *G06F 2009/45583* (2013.01)

(58) Field of Classification Search
CPC .................................................. G06F 9/45558
USPC .............................................................. 718/1
See application file for complete search history.

(56) References Cited

U.S. PATENT DOCUMENTS

| | | | |
|---|---|---|---|
| 9,459,904 B2 | 10/2016 | Mehta et al. | |
| 10,019,167 B2 | 7/2018 | Gray | |
| 10,241,674 B2 | 3/2019 | Eshwarappa et al. | |
| 2017/0168715 A1* | 6/2017 | Eshwarappa | G06F 9/45558 |
| 2017/0168737 A1* | 6/2017 | Kumar | G06F 9/45558 |
| 2021/0117220 A1 | 4/2021 | Zu et al. | |
| 2021/0149703 A1 | 5/2021 | Patle et al. | |
| 2022/0147253 A1* | 5/2022 | Sajeepa | G06F 3/065 |

FOREIGN PATENT DOCUMENTS

CN            112052068 A      12/2020

OTHER PUBLICATIONS

Author Unknown, "Managing Resources for Containers," kubernetes, Aug. 5, 2021, https://kubernetes.io/docs/concepts/configuration/manage-resources-containers/, 11 pages.

* cited by examiner

*Primary Examiner* — Timothy A Mudrick
(74) *Attorney, Agent, or Firm* — Dority & Manning, P.A.

(57) ABSTRACT

Migrating containers across Non-Uniform Memory Access (NUMA) nodes of a processor device is disclosed herein. In one example, a processor device identifies one or more containers each executing on one of a plurality of NUMA nodes of the processor device. For each container of the one or more containers, the processor device determines an allocation of a processing resource to the container by a source NUMA node on which the container is executing, and identifies one or more NUMA nodes of the plurality of NUMA nodes having an availability of the processing resource sufficient to execute the container. The processor device selects a target NUMA node from among the identified one or more NUMA nodes, and migrates the container from the source NUMA node to the target NUMA node.

18 Claims, 8 Drawing Sheets

MIGRATING CONTAINERS ACROSS NON-UNIFORM MEMORY ACCESS (NUMA) NODES OF A PROCESSOR DEVICE

BACKGROUND

Non-Uniform Memory Access (NUMA) refers to a multiprocessor architecture in which a processor device is made up of multiple interconnected NUMA nodes. Each NUMA node includes its own processor device and its own local memory, which the NUMA node can access faster than the non-local memory of other NUMA nodes. The NUMA architecture can minimize memory access bottlenecks by enabling processor threads to be assigned to the NUMA node associated with the memory allocated to the processor threads. As the use of NUMA architectures becomes more widespread, functionality for more effectively allocating the resources of NUMA nodes will be desirable.

SUMMARY

The examples disclosed herein provide migrating containers across Non-Uniform Memory Access (NUMA) nodes of a processor device. In one example, a processor device comprising a plurality of NUMA nodes provides a container migration service that provides functionality for reducing resource fragmentation when executing multiple containers across the NUMA nodes of the processor device. After identifying each container executing on a source NUMA node, the container migration service determines an allocation of a processing resource to the container, and identifies other NUMA nodes that have available processing resources sufficient to execute the container. The container migration service then selects a target NUMA node from among the identified NUMA nodes, and migrates the container from the source NUMA node to the target NUMA node. In this manner, the execution of multiple containers can be consolidated using fewer NUMA nodes, thus freeing the processing resources of the remaining NUMA nodes.

In another example, a method for migrating containers across NUMA nodes of a processor device is disclosed. The method comprises identifying, by a processor device, one or more containers each executing on one of a plurality of NUMA nodes of the processor device. The method further comprises, for each container of the one or more containers, determining, by the processor device, an allocation of a processing resource to the container by a source NUMA node on which the container is executing. The method also comprises identifying, by the processor device, one or more NUMA nodes of the plurality of NUMA nodes having an availability of the processing resource sufficient to execute the container. The method additionally comprises selecting, by the processor device, a target NUMA node from among the identified one or more NUMA nodes. The method further comprises migrating, by the processor device, the container from the source NUMA node to the target NUMA node.

In another example, a computing device for migrating containers across NUMA nodes of a processor device is disclosed. The computing device comprises a system memory, and a processor device communicatively coupled to the system memory. The processor device is to identify one or more containers each executing on one of a plurality of NUMA nodes of the processor device. The processor device is further to, for each container of the one or more containers, determine an allocation of a processing resource to the container by a source NUMA node on which the container is executing. The processor device is also to identify one or more NUMA nodes of the plurality of NUMA nodes having an availability of the processing resource sufficient to execute the container. The processor device is additionally to select a target NUMA node from among the identified one or more NUMA nodes. The processor device is further to migrate the container from the source NUMA node to the target NUMA node.

In another example, a non-transitory computer-readable medium for migrating containers across NUMA nodes of a processor device is disclosed. The non-transitory computer-readable medium stores thereon computer-executable instructions that, when executed, cause the processor device to identify one or more containers each executing on one of a plurality of NUMA nodes of the processor device. The computer-executable instructions further cause the processor device to, for each container of the one or more containers, determine an allocation of a processing resource to the container by a source NUMA node on which the container is executing. The computer-executable instructions also cause the processor device to identify one or more NUMA nodes of the plurality of NUMA nodes having an availability of the processing resource sufficient to execute the container. The computer-executable instructions additionally cause the processor device to select a target NUMA node from among the identified one or more NUMA nodes. The computer-executable instructions further cause the processor device to migrate the container from the source NUMA node to the target NUMA node.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
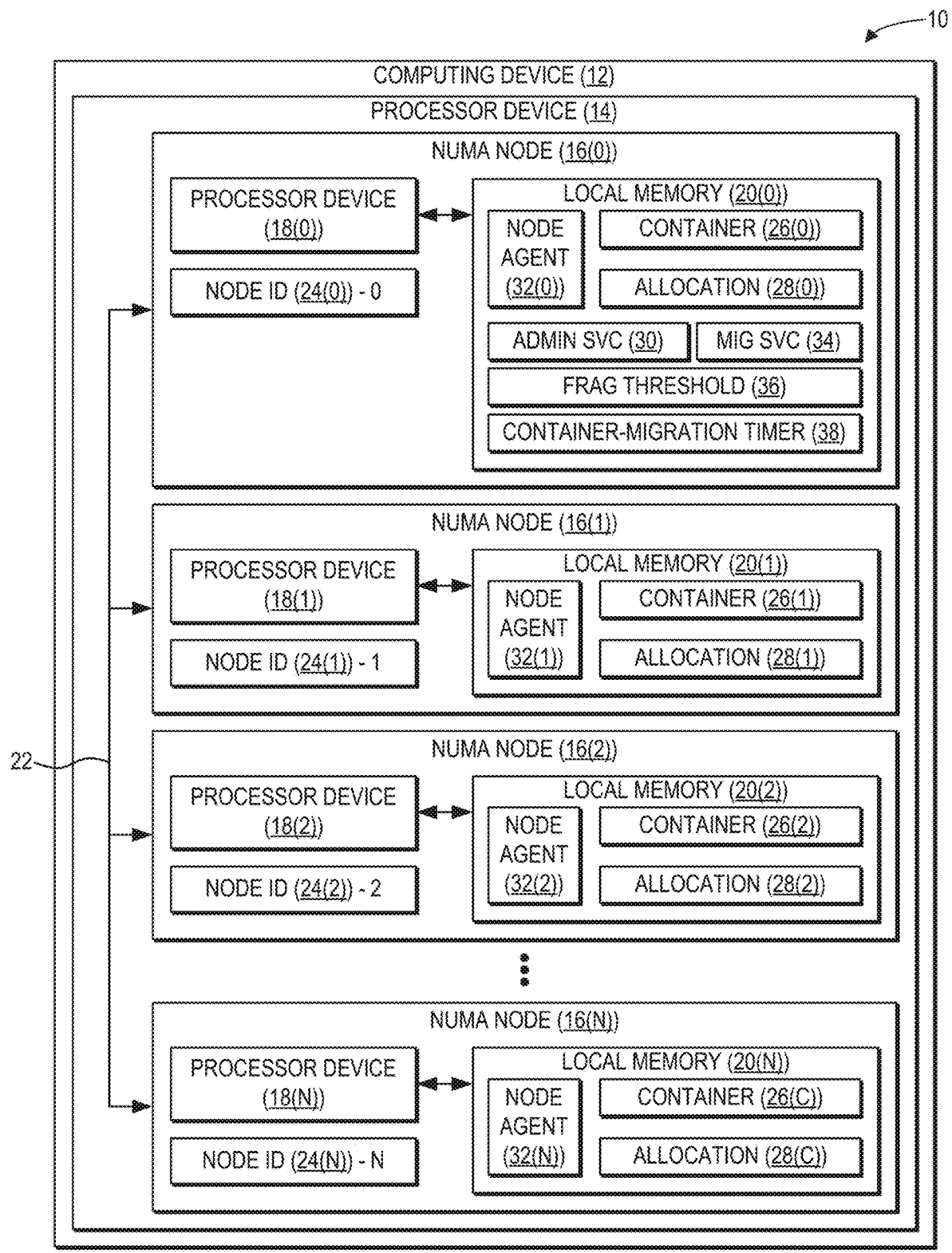
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first container" and "second container," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The phrase "Non-Uniform Memory Access (NUMA)" and derivatives thereof are used herein to refer a conventional multiprocessor architecture in which a processor device is made up of multiple interconnected NUMA nodes, each of which possesses its own processor and its own local memory. The physical configuration of the processor device enables each NUMA node to access its local memory faster than it can access the non-local memory of other NUMA nodes. As a result, memory access bottlenecks can be reduced or eliminated by the processor device assigning processor threads to NUMA nodes associated with the memory that is allocated to the processor threads.

However, the repeated execution and termination of multiple processor threads over time may cause fragmentation of processor resources (such as processing capacity, memory capacity, or availability of Peripheral Component Interconnect (PCI) devices, as non-limiting examples) over the NUMA nodes of the processor device. "Fragmentation" as used herein refers to a condition in which availability of a processing resource is inefficiently distributed among the NUMA nodes such that full utilization of the processing resource is impossible or unmanageable. Fragmentation of processor resources may pose particular challenges when using container orchestration systems such as Kubernetes that provide "containers," or isolated user-space instances, that can be deployed and executed by individual NUMA nodes of the processor device. For example, circumstances may arise in which no single NUMA node has enough available processing capacity and/or free memory to execute a given container, even though the NUMA nodes in aggregate have sufficient available processing capacity and/or free memory to execute the container.

In this regard, examples disclosed herein implement a container migration service for migrating containers across NUMA nodes in a processor device (e.g., to reducing resource fragmentation when executing multiple containers across the NUMA nodes of the processor device). The container migration service in some examples works in conjunction with or as part of a container administration service of a container orchestration system, and may be executed by a master NUMA node of a plurality of NUMA nodes of the processor device.

In exemplary operation, the container migration service identifies one or more containers (such as, e.g., Kubernetes containers, as a non-limiting example) that each are executing on one of the plurality of NUMA nodes of the processor device. In some examples, the container migration service may identify the containers in response to determining that a fragmentation level of a given processing resource across the plurality of NUMA nodes has exceeded a fragmentation threshold, and/or in response to expiration of a container-migration timer. For each identified container, the container migration service determines an allocation of the processing resource to the container by the NUMA node on which the container is executing (i.e., the "source NUMA node"). The processing resource may comprise a processing capacity of the source NUMA node, a memory capacity of the source NUMA node, or an availability of PCI devices of the source NUMA node, as non-limiting examples.

The container migration service also identifies one or more NUMA nodes of the plurality of NUMA nodes that have an availability of the processing resource sufficient to execute the container. For instance, the container migration service in some examples may determine an availability of the processing resource for each NUMA node, and may identify the one or NUMA nodes based on a comparison of the availability of the processing resource for each NUMA node with the allocation of the processing resource to the container. Thus, for example, if the container is allocated five (5) gigabytes of memory for execution, the container migration service may identify one or more NUMA nodes having at least five (5) gigabytes of available memory.

The container migration service next selects a target NUMA node from among the identified one or more NUMA nodes. The target NUMA node may comprise, e.g., the NUMA node having a lowest node identifier (ID) among the one or more NUMA nodes, as a non-limiting example. The container migration service then migrates the container from the source NUMA node to the target NUMA node. According to some examples, the process of migrating the container may comprise initiating execution of the container by the target NUMA node, and terminating execution of the container on the source NUMA node.

FIG. 1 is a block diagram of a computing system 10 according to one example. The computing system 10 includes a computing device 12 that comprises a processor device 14. The processing capability of the processor device 14 is subdivided among a plurality of NUMA nodes 16(0)-16(N), each of which comprises a corresponding processor device 18(0)-18(N) and a local memory 20(0)-20(N). As seen in FIG. 1, the NUMA nodes 16(0)-16(N) are interconnected by an interconnect bus 22, which enables each of the NUMA nodes 16(0)-16(N) to access the local memory 20(0)-20(N) of the other NUMA nodes 16(0)-16(N). Because of the physical configuration of the processor device 14, though, the time required for each of the NUMA nodes 16(0)-16(N) to access its own local memory 20(0)-20(N) is lower than the time required to access the local memory 20(0)-20(N) of the other NUMA nodes 16(0)-16(N). The NUMA nodes 16(0)-16(N) are associated with corresponding node identifiers (IDs) (captioned as "NODE ID") in FIG. 1) 24(0)-24(N) (e.g., the NUMA node 16(0) in FIG. 1 has a node ID 24(0) of "0," the NUMA node 16(1) in FIG. 1 has a node ID 24(1) of "1," and so forth in like manner). It is to be understood that the computing device 12 in some examples may include constituent elements in addition to those illustrated in FIG. 1.

In the example of FIG. 1, the processor device 14 is executing a container orchestration system (e.g., Kubernetes, as a non-limiting example) that enables the execution and management of containers 26(0)-26(C). Each of the containers 26(0)-26(C) provides an isolated user-space instance in which applications can be executed. The containers 26(0)-26(C) each limit the access of such applications to only the resources and devices assigned to that container 26(0)-26(C). Each of the containers 26(0)-26(C) is associated with an allocation 28(0)-28(N) of a processing resource (e.g., processing capacity, memory capacity, availability of PCI devices, and the like, as non-limiting examples) to the container 26(0)-26(C) by the NUMA node 16(0)-16(N) on which the container 26(0)-26(C) is executing. While FIG. 1 shows each of the NUMA nodes 16(0)-16(N) executing a single corresponding container 26(0)-26(C), it is to be understood that the NUMA nodes 16(0)-16(N) may each execute more or fewer containers than shown in FIG. 1. Additionally, it is to be understood that, while FIG. 1 shows each of the containers 26(0)-26(C) as being associated with a single allocation 28(0)-28(N), it is to be understood that the containers 26(0)-26(C) may be associated with multiple allocations 28(0)-28(N) each corresponding to a different processing resource.

Orchestration of the containers 26(0)-26(C) for the NUMA nodes 16(0)-16(N) of FIG. 1 is managed by a container administration service (captioned as "ADMIN SVC" in FIG. 1) 30 that executes on a master NUMA node, which in the example of FIG. 1 is the NUMA node 16(0). In addition, each of the NUMA nodes 16(0)-16(N) executes a corresponding node agent 32(0)-32(N) that communicates with the container administration service 30 regarding the status of containers executing on that NUMA node 16(0)-16(N), and that handles tasks such as execution and termination of containers.

As noted above, the use of container orchestration systems over a plurality of NUMA nodes can, over time, result in fragmentation of the processing resources of the NUMA nodes 16(0)-16(N). For example, assume that, in the example of FIG. 1, each of the NUMA nodes 16(0)-16(N) provides eight (8) gigabytes of memory, and that the containers 26(0)-26(C) are allocated three (3) gigabytes of memory each. Assume further that the container administration service 30 attempts to execute a new container (not shown) that requires an allocation of six (6) gigabytes. In this example, the NUMA nodes 16(0)-16(N) together have a total of 20 gigabytes of free memory, but the new container cannot be executed on any of the NUMA nodes 16(0)-16(N) because the memory resources of the NUMA nodes 16(0)-16(N) are fragmented such that each of the NUMA nodes 16(0)-16(N) only has five (5) gigabytes of free memory.

Accordingly, in this regard, the processor device 14 of the computing device 12 implements a container migration service (captioned as "MIG SVC" in FIG. 1) 34 to provide a mechanism for reducing resource fragmentation across the NUMA nodes 16(0)-16(N) of the processor device 14. In some examples, the container migration service 34 may be provided as an integral element of the container administration service 30 or may be a separate element working in conjunction with the container administration service 30. The container migration service 34 in some examples may be executed in response to a determination that a fragmentation level of a given processing resource across all of the NUMA nodes 16(0)-16(N) exceeds a fragmentation threshold (captioned as "FRAG THRESHOLD" in FIG. 1) 36. Some examples may provide that the process of migrating containers to mitigate resource fragmentation is performed at regular intervals by executing the container migration service 34 in response to expiration of a container-migration timer 38, and subsequently resetting the container-migration timer 38.

In exemplary operation, the container migration service 34 identifies one or more containers, such as the containers 26(0)-26(C), that each are executing on one of the plurality of NUMA nodes 16(0)-16(N) of the processor device 14. For each identified container, the container migration service 34 determines the allocation of a processing resource to the container by the NUMA node 16(0)-16(N) on which the container is executing (referred to herein as the "source NUMA node"). For example, for the container 26(2), the container migration service determines the allocation 28(2) for the processing resource to the container 26(2) by the source NUMA node 16(2). As noted above, the processing resource may comprise a processing capacity of the source NUMA node 16(2), a memory capacity of the source NUMA node 16(2), or an availability of PCI devices of the source NUMA node 16(2), as non-limiting examples.

In the example above, the container migration service 34 also identifies one or more NUMA nodes of the plurality of NUMA nodes 16(0)-16(N) that have an availability of the processing resource sufficient to execute the container 26(2). Thus, according to some examples, the container migration service 34 may determine an availability of the processing resource for each of the NUMA nodes 16(0)-16(N), and may identify the one or more NUMA nodes based on a comparison of the availability of the processing resource for each of the NUMA nodes 16(0)-16(N) with the allocation 28(2) of the processing resource to the container 26(2). For purposes of illustration, assume that the container migration service 34 identifies the NUMA nodes 16(0) and 16(1) as having an availability of the processing resource sufficient to execute the container 26(2).

Next, the container migration service 34 selects a target NUMA node from among the identified one or more NUMA nodes 16(0) and 16(1) by, e.g., selecting the NUMA node having the lower node ID among the node IDs 24(0)-24(N). Assume for the sake of illustration that the container migration service 34 selects the NUMA node 16(0) as the target NUMA node 16(0). The container migration service 34 then migrates the container 26(2) from the source NUMA node 16(2) to the target NUMA node 16(0). In some examples, migrating the container 26(2) may comprise initiating execution of the container 26(2) by the target NUMA node 16(0), and terminating execution of the container 26(2) on the source NUMA node 16(2). In some examples, the container migration service 34 may initiate execution of the container 26(2) by the target NUMA node 16(0) and terminate execution of the container 26(2) on the source NUMA node 16(2) by accessing functionality provided by the node agents 32(0) and 32(2), respectively. Note that the container migration service 34 in some examples may opt not to migrate the container 26(2) if it is determined that the source NUMA node 16(2) is more appropriate for executing the container 26(2) than the selected target NUMA node 16(0). For instance, the container migration service 34 may opt not to migrate a container if all potential target NUMA nodes do not have lower node IDs than the source NUMA node, even if the potential target NUMA nodes have sufficient availability of the processing resource to execute the container.

It is to be understood that, because the container migration service 34 is a component of the computing device 12, functionality implemented by the container migration service 34 may be attributed to the computing system 10 generally. Moreover, in examples where the container migration service 34 comprises software instructions that program the processor device 14 to carry out functionality discussed herein, functionality implemented by the container migration service 34 may be attributed herein to the processor device 14. It is to be further understood that while, for purposes of illustration only, the container migration service 34 is depicted as a single component, the functionality implemented by the container migration service 34 may be implemented in any number of components, and the examples discussed herein are not limited to any particular number of components. Additionally, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
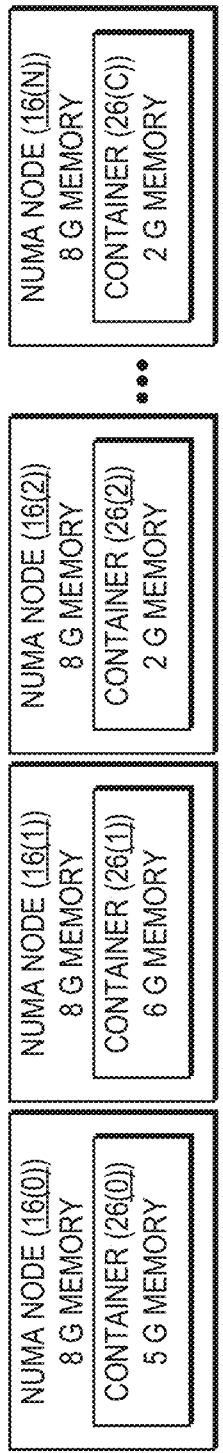
FIGS. 2A-2C are diagrams illustrating an exemplary scenario in which containers of FIG. 1 are migrated among the Non-Uniform Memory Access (NUMA) nodes of FIG. 1 to reduce resource fragmentation.
Figure 2B:
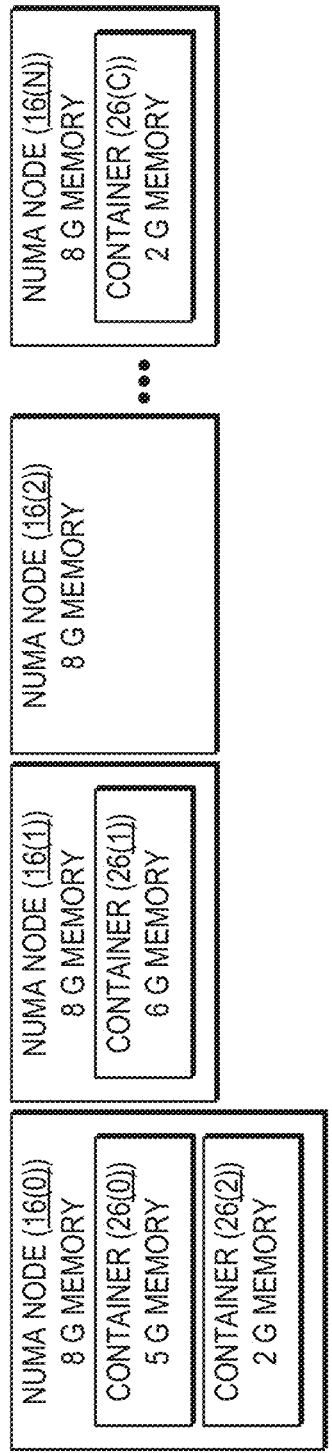
Figure 2C:
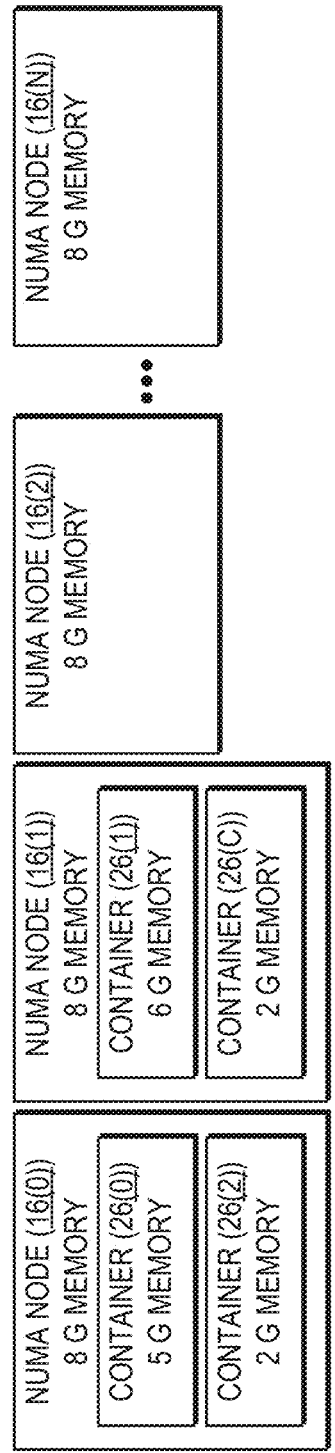

FIGS. 2A-2C illustrate an exemplary scenario in which the containers 26(0)-26(C) of FIG. 1 are migrated among the NUMA nodes 16(0)-16(N) of FIG. 1 to reduce resource fragmentation. FIG. 2A illustrates the deployment of the containers 26(0)-26(C) at an initial point in time when the container migration service 34 is executed (e.g., when it is determined that a fragmentation level of a given processing resource across all of the NUMA nodes 16(0)-16(N) exceeds the fragmentation threshold 36, or when the container-migration timer 38 expires). For purposes of illustration, the processing resource at issue in FIGS. 2A-2C is memory capacity. As seen in FIG. 2A, each of the NUMA nodes 16(0)-16(N) provides a total of eight (8) gigabytes of memory. At the point in time illustrated in FIG. 2A, the state of the NUMA nodes 16(0)-16(N) is as follows:

The NUMA node 16(0) is executing the container 26(0), to which five (5) gigabytes of memory is allocated, leaving three (3) gigabytes of memory free;

The NUMA node 16(1) is executing the container 26(1), to which six (6) gigabytes of memory is allocated, leaving two (2) gigabytes of memory free;

The NUMA node 16(2) is executing the container 26(2), to which two (2) gigabytes of memory is allocated, leaving six (6) gigabytes of memory free; and The NUMA node 16(N) is executing the container 26(C), to which two (2) gigabytes of memory is allocated, leaving six (6) gigabytes of memory free.

FIG. 2B shows the resulting state of the NUMA nodes 16(0)-16(N) after the container migration service 34 has processed the containers 26(0)-26(2) of the NUMA nodes 16(0)-16(2). In this example, the container migration service 34 has opted not to migrate the container 26(0) or the container 26(1) because, in both cases, the potential target NUMA nodes 16(2) and 16(N) have higher node IDs than the source NUMA nodes 16(0) and 16(1), as seen in FIG. 1. The container migration service 34, in processing the container 26(2), identifies the NUMA nodes 16(0), 16(1), and 16(N) as having sufficient available memory to execute the container 26(2). The container migration service 34 then selects the NUMA node 16(0) as the target NUMA node 16(0), and migrates the container 26(2) from the source NUMA node 16(2) to the target NUMA node 16(0).

Similarly, FIG. 2C shows the resulting state of the NUMA nodes 16(0)-16(N) after the container migration service 34 has processed the container 26(C) of the NUMA node 16(N). The container migration service 34 identifies the NUMA nodes 16(1) and 16(2) as having sufficient available memory to execute the container 26(C), and selects the NUMA node 16(1) as the target NUMA node 16(1). The container migration service 34 then migrates the container 26(C) from the source NUMA node 16(N) to the target NUMA node 16(1).

Figure 3A:
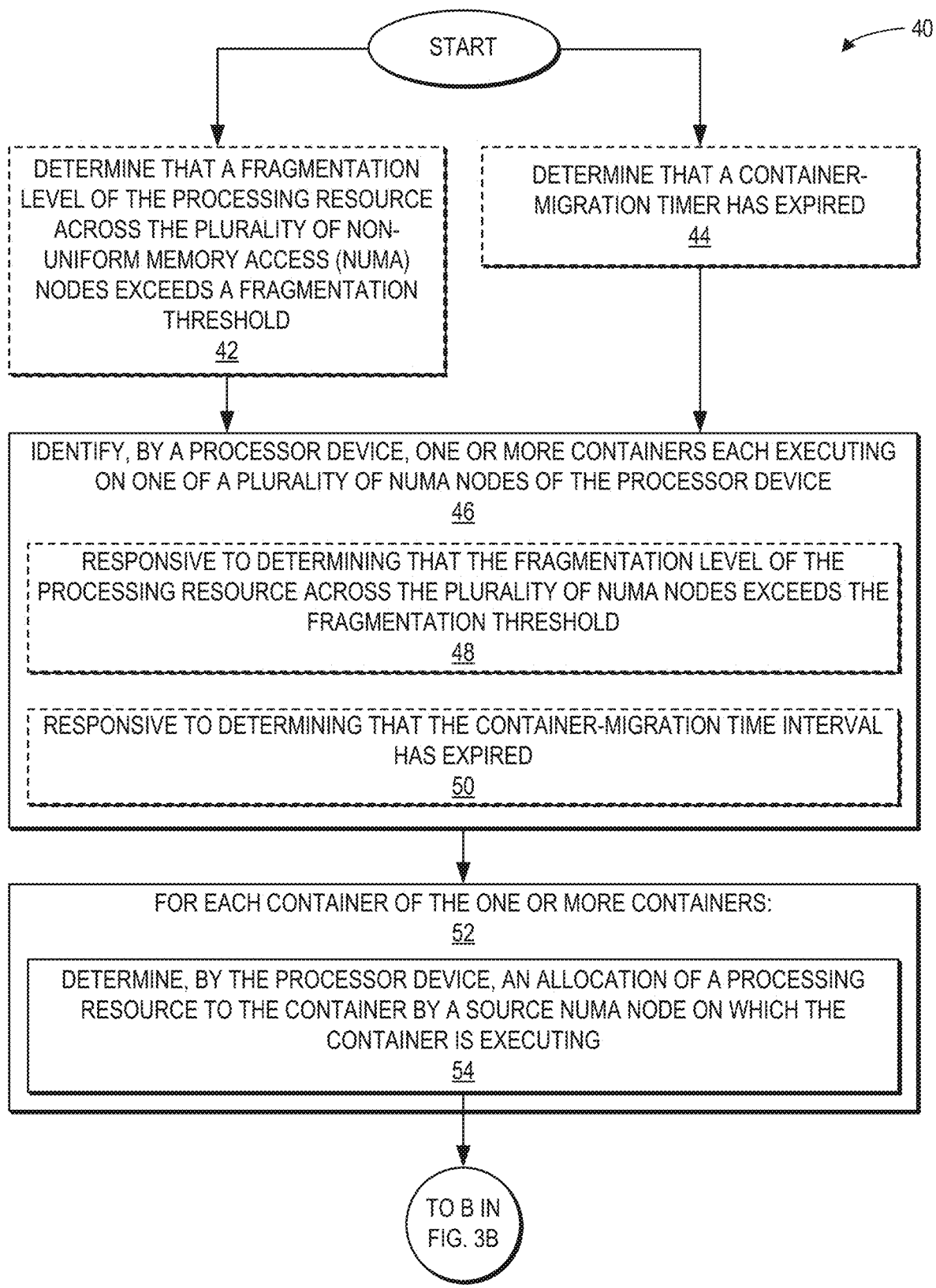
FIGS. 3A-3C are flowcharts illustrating operations performed by the computing system of FIG. 1 for migrating containers across NUMA nodes in a processor device, according to one example.
Figure 3B:
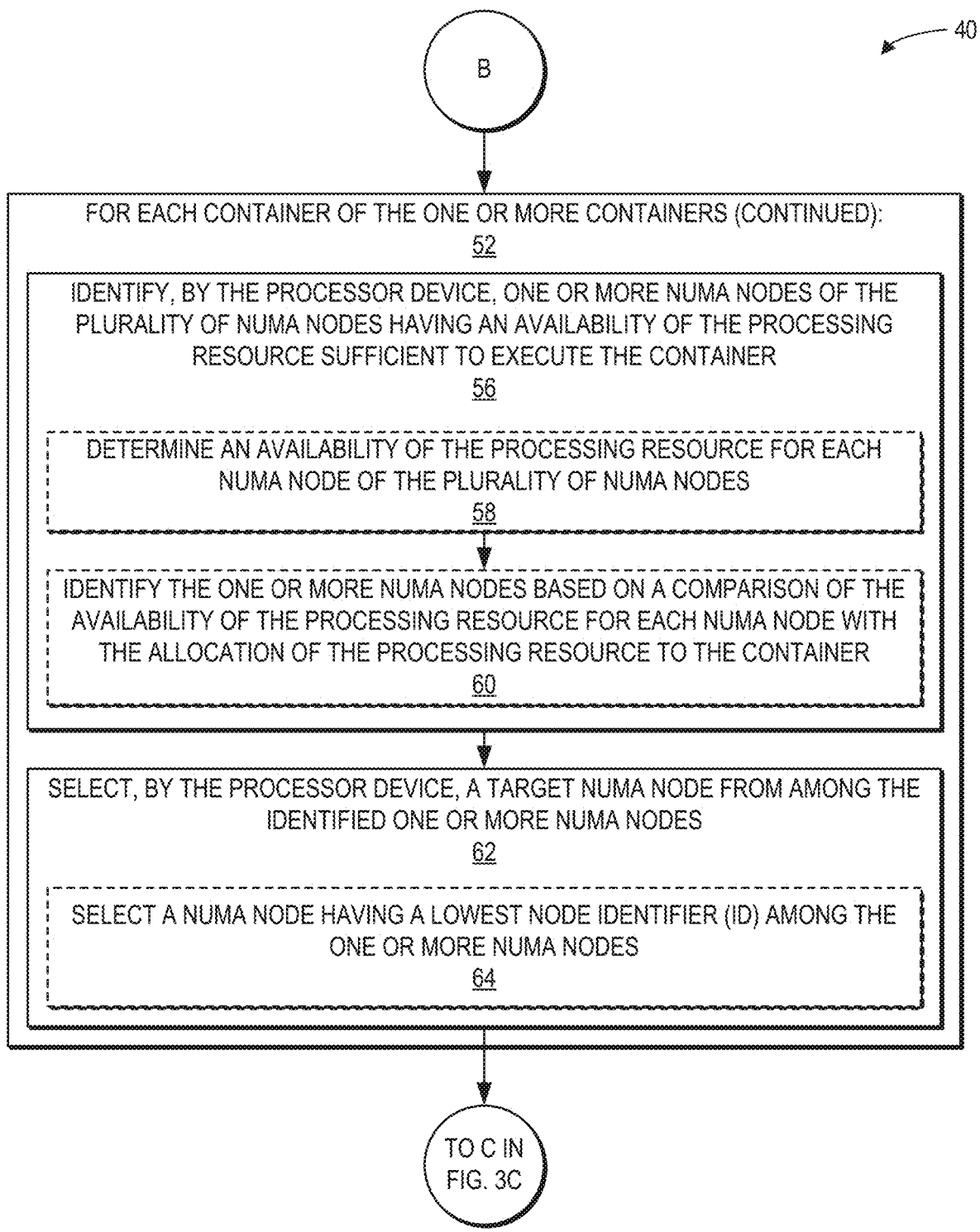
Figure 3C:
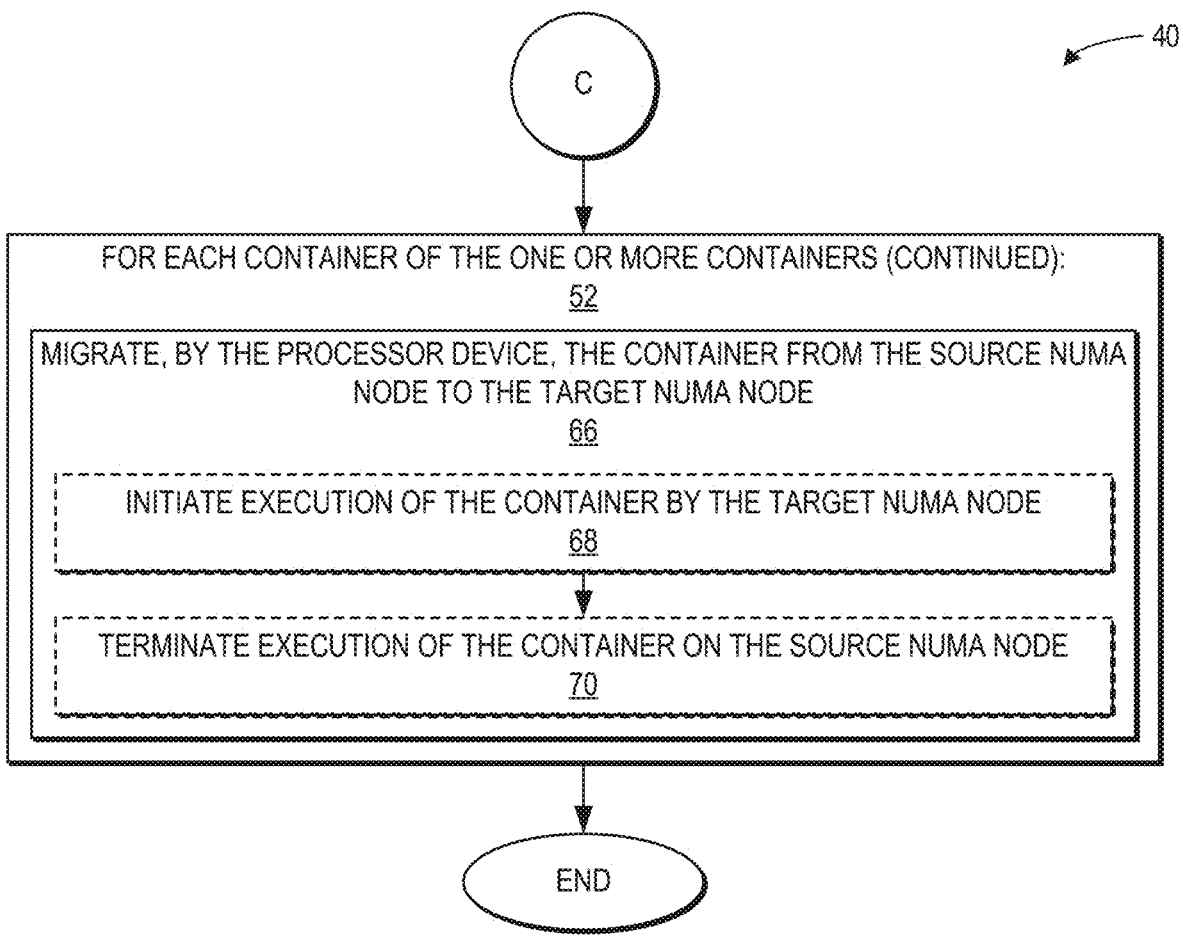

FIGS. 3A-3C provide a flowchart 40 to illustrate exemplary operations performed by the computing system 10 of FIG. 1 for migrating containers across NUMA nodes in a processor device according to one example. Elements of FIG. 1 are referenced in describing FIGS. 3A-3C for the sake of clarity. It is to be understood that, in some examples, some operations illustrated in FIGS. 3A-3C may be performed in an order other than illustrated herein, and/or may be omitted. In FIG. 3A, operations in some examples begin with the processor device 14 of FIG. 1 (e.g., by executing the container migration service 34 of FIG. 1) determining that a fragmentation level of the processing resource across a plurality of NUMA nodes (e.g., the plurality of NUMA nodes 16(0)-16(N) of FIG. 1) exceeds a fragmentation threshold, such as the fragmentation threshold 36 of FIG. 1 (block 42). Some examples may provide that the container migration service 34 may also or instead determine that a container-migration timer, such as the container-migration timer 38 of FIG. 1, has expired (block 44).

The container migration service 34 identifies one or more containers (e.g., the one or more containers 26(0)-26(C) of FIG. 1) each executing on one of the plurality of NUMA nodes 16(0)-16(N) of the processor device 14 (block 46). In some examples discussed above, the operations of block 46 for identifying the one or more containers 26(0)-26(C) may be performed responsive to determining that the fragmentation level of the processing resource across the plurality of NUMA nodes 16(0)-16(N) exceeds the fragmentation threshold 36 (block 48). Some examples discussed above may provide that the operations of block 46 for identifying the one or more containers 26(0)-26(C) may be performed responsive to determining that the container-migration timer 38 has expired (block 50).

The container migration service 34 then performs a series of operations for each container, such as the container 26(2) of FIG. 1, of the one or more containers 26(0)-26(C) (block 52). The container migration service 34 determines an allocation of a processing resource (e.g., the allocation 28(2) of FIG. 1) to the container 26(2) by a source NUMA node 16(2) on which the container 26(2) is executing (block 54). Operations then continue at block 56 of FIG. 3B.

Referring now to FIG. 3B, the operations of block 52 performed by the container migration service 34 for each container of the one or more containers 26(0)-26(C) continue. The container migration service 34 identifies one or more NUMA nodes, such as the NUMA nodes 16(0)-16(1) of FIG. 1, of the plurality of NUMA nodes 16(0)-16(N) having an availability of the processing resource sufficient to execute the container 26(2) (block 56). According to some examples, the operations of block 56 for identifying the one or more NUMA nodes 16(0)-16(1) having an availability of the processing resource sufficient to execute the container 26(2) may comprise the container migration service 34 determining an availability of the processing resource for each NUMA node of the plurality of NUMA nodes 16(0)-16(N) (block 58). The container migration service 34 then identifies the one or more NUMA nodes 16(0)-16(1) based on a comparison of the availability of the processing resource for each NUMA node with the allocation 28(0) of the processing resource to the container 26(0) (block 60).

The container migration service 34 then selects a target NUMA node, such as the target NUMA node 16(0) of FIG. 1, from among the identified one or more NUMA nodes 16(0)-16(1) (block 62). In some examples, the operations of block 62 for selecting the target NUMA node 16(0) may comprise selecting a NUMA node having a lowest node ID (e.g., the node ID 24(0) of FIG. 1) among the one or more NUMA nodes 16(0)-16(1) (block 64). Operations then continue at block 66 of FIG. 3C.

Turning now to FIG. 3C, the operations of block 52 performed by the container migration service 34 for each container of the one or more containers 26(0)-26(C) continue. The container migration service 34 migrates the container 26(2) from the source NUMA node 16(2) to the target NUMA node 16(0) (block 66). Some examples may provide that the operations of block 66 for migrating the container 26(2) from the source NUMA node 16(2) to the target NUMA node 16(0) may comprise the container migration service 34 initiating execution of the container 26(2) by the target NUMA node 16(0) (block 68). The container migration service 34 may also terminate execution of the container 26(2) on the source NUMA node 16(2) (block 70).

Figure 4:
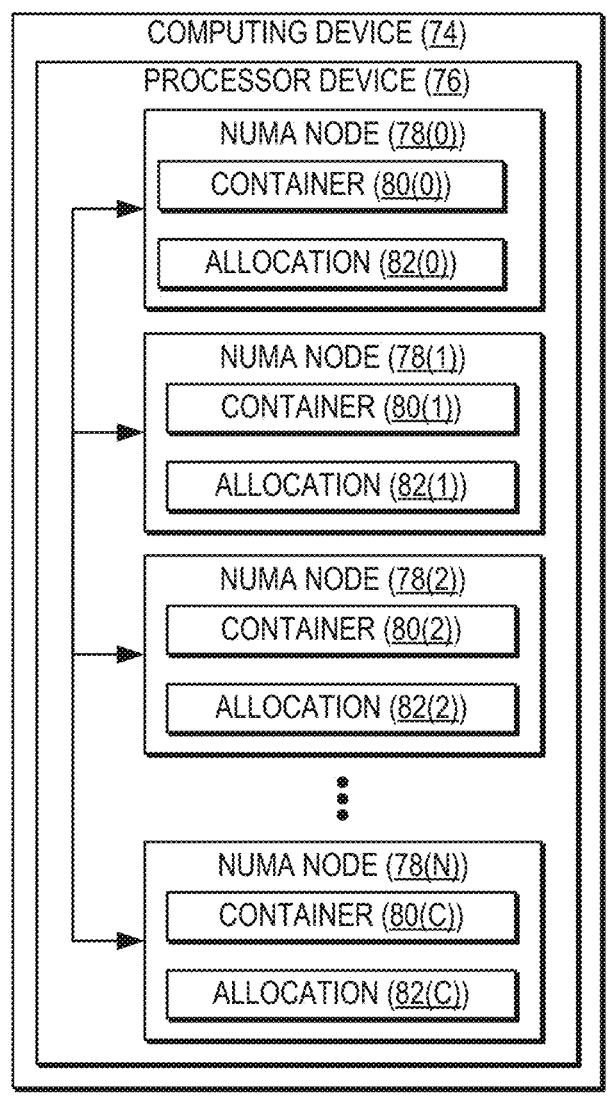
FIG. 4 is a simpler block diagram of the computing system of FIG. 1 for migrating containers across NUMA nodes in a processor device, according to one example.

FIG. 4 is a simpler block diagram of the computing system 10 of FIG. 1 for migrating containers across NUMA nodes of a processor device, according to one example. The computing system 72 of FIG. 4 includes a computing device 74 that comprises a processor device 76. The processor device 76 is subdivided into a plurality of NUMA nodes 78(0)-78(N). In the example of FIG. 4, the processor device 76 is executing a container orchestration system that enables the execution and management of containers 80(0)-80(C), each of which is associated with an allocation 82(0)-82(N) of a processing resource to the container 80(0)-80(C) by the NUMA node 78(0)-78(N) on which the container 80(0)-80(C) is executing.

In exemplary operation, the processor device 76 identifies one or more containers, such as the containers 80(0)-80(C), that each are executing on one of the plurality of NUMA nodes 78(0)-78(N) of the processor device 76. For each identified container such as the container 80(2), the processor device 76 determines the allocation 82(2) of a processing resource to the container 80(2) by the NUMA node 78(2) on which the container is executing (i.e., the "source NUMA node"). The processor device 76 also identifies one or more NUMA nodes, such as the NUMA nodes 78(0)-78(1), of the plurality of NUMA nodes 78(0)-78(N) that have an availability of the processing resource sufficient to execute the container 80(2). The processor device 76 selects a target NUMA node (e.g., the target NUMA node 78(0) of FIG. 4) from among the identified one or more NUMA nodes 78(0)-78(1). The processor device 76 then migrates the container 80(2) from the source NUMA node 78(2) to the target NUMA node 78(0).

Figure 5:
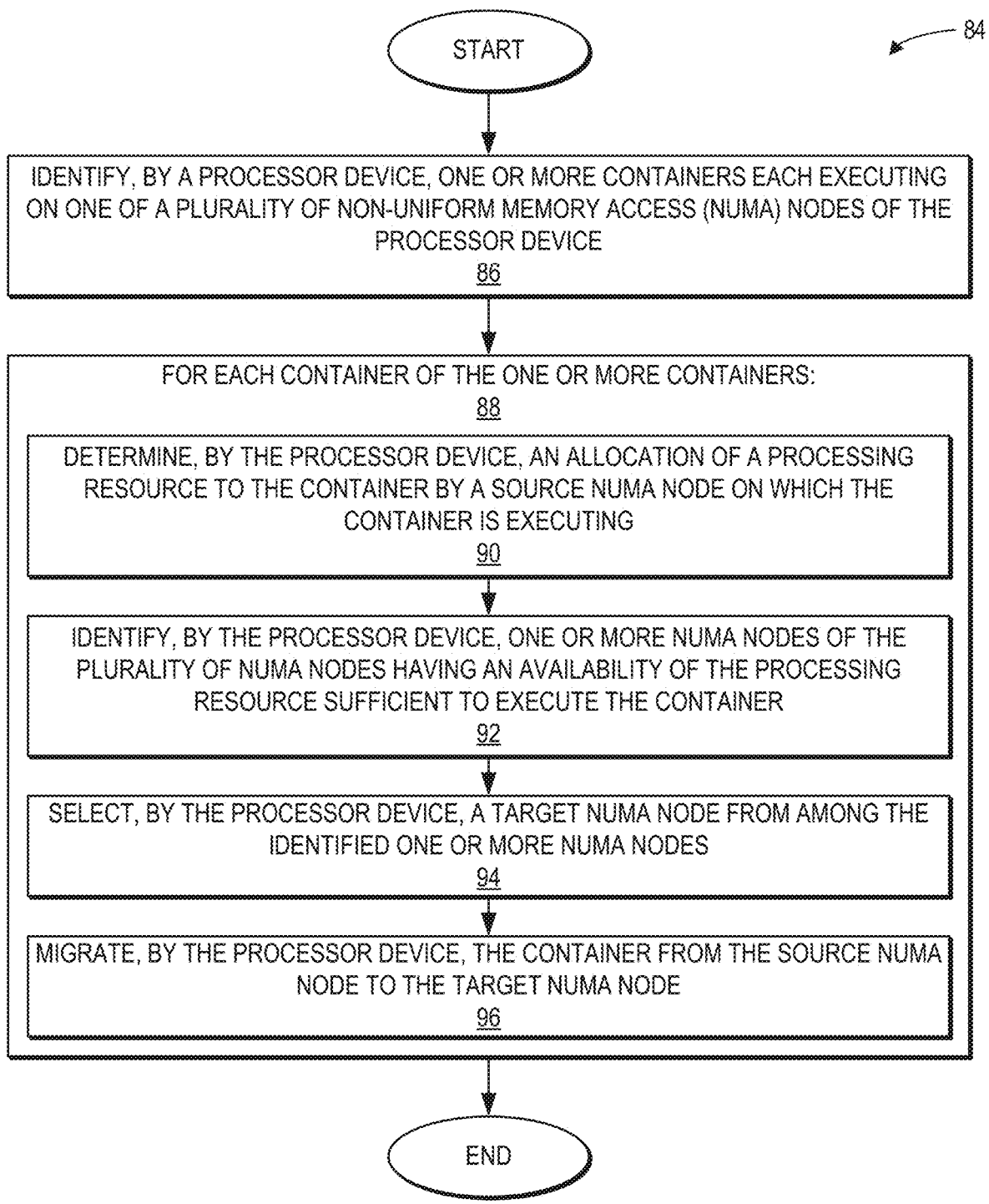
FIG. 5 is a flowchart of a simplified method for migrating containers across NUMA nodes in a processor device by the computing device of FIG. 4, according to one example.

To illustrate a simplified method for migrating containers across NUMA nodes in a processor device in the computing system 72 of FIG. 4 according to one example, FIG. 5 provides a flowchart 84. Elements of FIG. 4 are referenced in describing FIG. 5 for the sake of clarity. In FIG. 5, operations begin with the processor device 76 of the computing device 74 identifying the one or more containers 80(0)-80(C) each executing on one of the plurality of NUMA nodes 78(0)-78(N) of the processor device 76 (block 86). The processor device 76 then performs a series of operations for each container of the one or more containers 80(0)-80(C) (block 88). The processor device 76 determines the allocation 82(0) of the processing resource to the container 80(0) by the source NUMA node 78(2) on which the container 80(0) is executing (block 90). The processor device 76 identifies the one or more NUMA nodes 78(0)-78(1) of the plurality of NUMA nodes 78(0)-78(N) having an availability of the processing resource sufficient to execute the container 80(0) (block 92). The processor device 76 selects the target NUMA node 78(0) from among the identified one or more NUMA nodes 78(0)-78(1) (block 94). The processor device 76 then migrates the container 80(0) from the source NUMA node 78(2) to the target NUMA node 78(0) (block 96).

Figure 6:
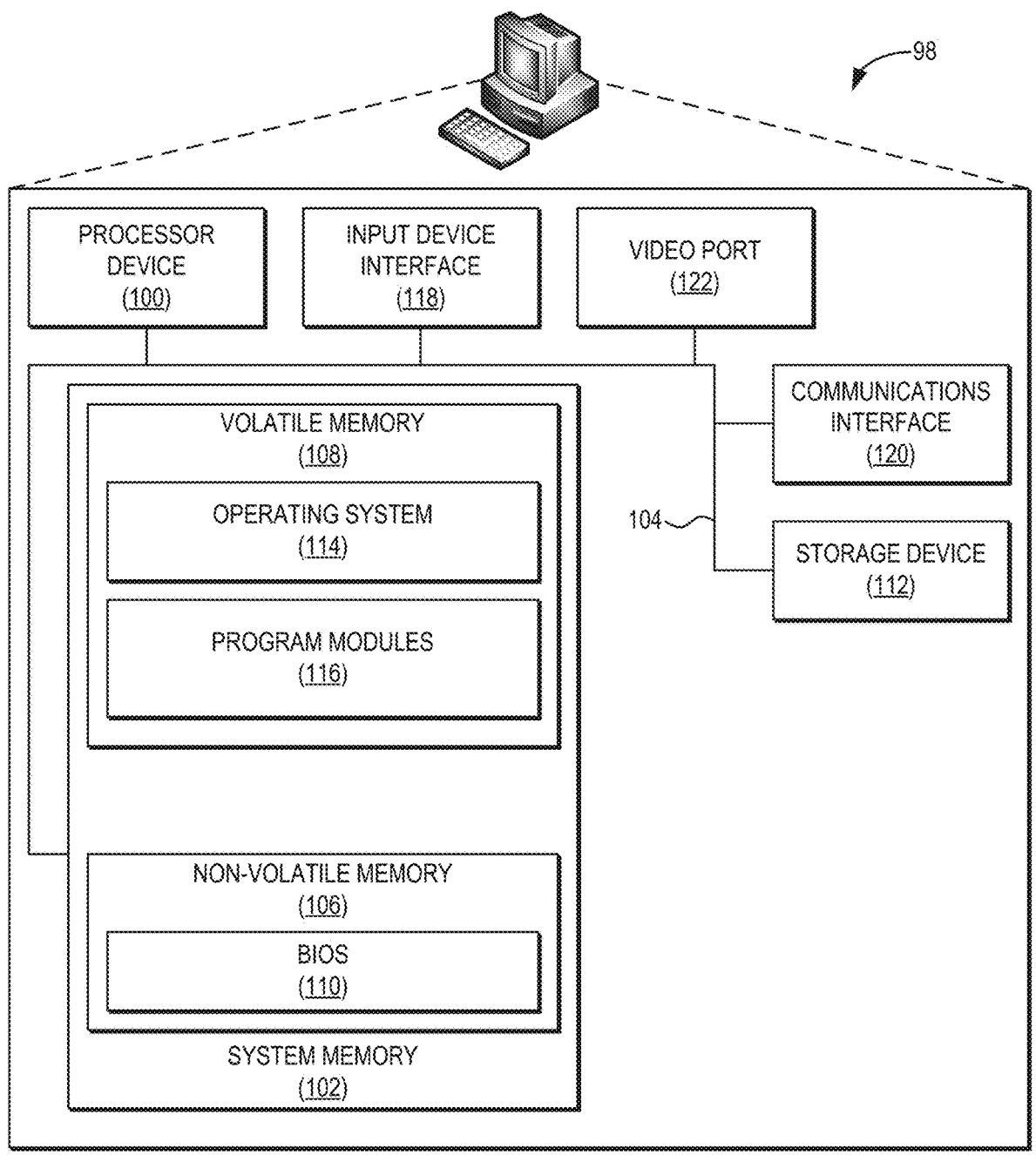
FIG. 6 is a block diagram of a computing device suitable for implementing examples, according to one example.

FIG. 6 is a block diagram of a processor-based computing device 98 ("computing device 98"), such as the computing device 12 of FIG. 1 in some examples, suitable for implementing examples according to one example. The computing device 98 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 98 includes a processor device 100, a system memory 102, and a system bus 104. The system bus 104 provides an interface for system components including, but not limited to, the system memory 102 and the processor device 100. The processor device 100 can be any commercially available or proprietary processor.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory 106 (e.g., read-only memory (ROM), erasable programmable ROM (EPROM), electrically EPROM (EEPROM), etc.), and volatile memory 108 (e.g., RAM). A basic input/output system (BIOS) 110 may be stored in the non-volatile memory 106 and can include the basic routines that help to transfer information among elements within the computing device 98. The volatile memory 108 may also include a high-speed RAM, such as static RAM, for caching data.

The computing device 98 may further include or be coupled to a non-transitory computer-readable storage medium such as a storage device 112, which may comprise, for example, an internal or external hard disk drive (HDD) (e.g., enhanced integrated drive electronics (EIDE) or serial advanced technology attachment (SATA)), for storage, flash memory, or the like. The storage device 112 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 112 and in the volatile memory 108, including an operating system 114 and one or more program modules 116 (e.g., the container migration service 34 of FIG. 1) which may implement the functionality described herein in whole or in part. It is to be appreciated that the examples can be implemented with various commercially available operating systems 114 or combinations of operating systems 114. All or a portion of the examples may be implemented as a computer program product stored on a transitory or non-transitory computer-usable or computer-readable storage medium, such as the storage device 112, which includes complex programming instructions, such as complex computer-readable program code, to cause the processor device 100 to carry out the steps described herein. Thus, the computer-readable program code can comprise software instructions for implementing the functionality of the examples described herein when executed on the processor device 100. The processor device 100 may serve as a controller, or control system, for the computing device 98 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 100 through an input device interface 118 that is coupled to the system bus 104 but can be connected by other interfaces, such as a parallel port, an Institute of Electrical and Electronic Engineers (IEEE) 1394 serial port, a Universal Serial Bus (USB) port, an IR interface, and the like.

The computing device 98 may also include a communications interface 120 suitable for communicating with a network as appropriate or desired. The computing device 98 may also include a video port 122 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
   identifying, by a processor device, one or more containers each executing on one of a plurality of Non-Uniform Memory Access (NUMA) nodes of the processor device; and
   for each container of the one or more containers:
      determining, by the processor device, an allocation of a processing resource to the container by a source NUMA node on which the container is executing;
      determining, by the processor device, that a container-migration timer for the container has expired, wherein the container-migration timer was initiated when the container was last migrated;
      responsive to determining that the container-migration timer has expired, identifying, by the processor device, one or more NUMA nodes of the plurality of NUMA nodes having an availability of the processing resource sufficient to execute the container;
      selecting, by the processor device, a target NUMA node from among the identified one or more NUMA nodes; and
      migrating, by the processor device, the container from the source NUMA node to the target NUMA node.

2. The method of claim 1, wherein identifying the one or more NUMA nodes of the plurality of NUMA nodes having an availability of the processing resource sufficient to execute the container comprises:
   determining an availability of the processing resource for each NUMA node of the plurality of NUMA nodes; and
   identifying the one or more NUMA nodes based on a comparison of the availability of the processing resource for each NUMA node with the allocation of the processing resource to the container.

3. The method of claim 1, wherein selecting the target NUMA node comprises selecting a NUMA node having a lowest node identifier (ID) among the one or more NUMA nodes.

4. The method of claim 1, wherein migrating the container from the source NUMA node to the target NUMA node comprises:
   initiating execution of the container by the target NUMA node; and
   terminating execution of the container on the source NUMA node.

5. The method of claim 1, further comprising determining that a fragmentation level of the processing resource across the plurality of NUMA nodes exceeds a fragmentation threshold;
   wherein identifying the one or more containers each executing on one of the plurality of NUMA nodes of the processor device is responsive to determining that the fragmentation level of the processing resource across the plurality of NUMA nodes exceeds the fragmentation threshold.

6. The method of claim 1, wherein the one or more containers comprise one or more Kubernetes containers.

7. The method of claim 1, wherein the processing resource comprises one of processing capacity, memory capacity, or availability of Peripheral Component Interconnect (PCI) devices.

8. A computing device, comprising:
   a system memory; and
   a processor device communicatively coupled to the system memory, the processor device to:
      identify one or more containers each executing on one of a plurality of Non-Uniform Memory Access (NUMA) nodes of the processor device; and
      for each container of the one or more containers:
         determine an allocation of a processing resource to the container by a source NUMA node on which the container is executing;
         determine that a container-migration timer for the container has expired, wherein the container-migration timer was initiated when the container was last migrated;
         responsive to determining that the container-migration timer has expired, identify one or more NUMA nodes of the plurality of NUMA nodes having an availability of the processing resource sufficient to execute the container;
         select a target NUMA node from among the identified one or more NUMA nodes; and
         migrate the container from the source NUMA node to the target NUMA node.

9. The computing device of claim 8, wherein to identify the one or more NUMA nodes of the plurality of NUMA nodes having an availability of the processing resource sufficient to execute the container is to:
   determine an availability of the processing resource for each NUMA node of the plurality of NUMA nodes; and
   identify the one or more NUMA nodes based on a comparison of the availability of the processing resource for each NUMA node with the allocation of the processing resource to the container.

10. The computing device of claim 8, wherein to select the target NUMA node is to select a NUMA node having a lowest node identifier (ID) among the one or more NUMA nodes.

11. The computing device of claim 8, wherein to migrate the container from the source NUMA node to the target NUMA node is to:
   initiate execution of the container by the target NUMA node; and terminate execution of the container on the source NUMA node.

12. The computing device of claim 8, wherein the processor device is further to determine that a fragmentation level of the processing resource across the plurality of NUMA nodes exceeds a fragmentation threshold;
   wherein to identify the one or more containers each executing on one of the plurality of NUMA nodes of the processor device is to identify the one or more containers responsive to determining that the fragmentation level of the processing resource across the plurality of NUMA nodes exceeds the fragmentation threshold.

13. The computing device of claim 8, wherein the one or more containers comprise one or more Kubernetes containers.

14. The computing device of claim 8, wherein the processing resource comprises one of processing capacity, memory capacity, or availability of Peripheral Component Interconnect (PCI) devices.

15. A non-transitory computer-readable medium having stored thereon computer-executable instructions that, when executed, cause a processor device to:
   identify one or more containers each executing on one of a plurality of Non-Uniform Memory Access (NUMA) nodes of the processor device; and
   for each container of the one or more containers:
      determine an allocation of a processing resource to the container by a source NUMA node on which the container is executing;
      determine that a container-migration timer for the container has expired, wherein the container-migration timer was initiated when the container was last migrated;
      responsive to determining that the container-migration timer has expired, identify one or more NUMA nodes of the plurality of NUMA nodes having an availability of the processing resource sufficient to execute the container;
      select a target NUMA node from among the identified one or more NUMA nodes; and
      migrate the container from the source NUMA node to the target NUMA node.

16. The non-transitory computer-readable medium of claim 15, wherein to identify the one or more NUMA nodes of the plurality of NUMA nodes having an availability of the processing resource sufficient to execute the container is to:
   determine an availability of the processing resource for each NUMA node of the plurality of NUMA nodes; and
   identify the one or more NUMA nodes based on a comparison of the availability of the processing resource for each NUMA node with the allocation of the processing resource to the container.

17. The non-transitory computer-readable medium of claim 15, wherein to select the target NUMA node is to select a NUMA node having a lowest node identifier (ID) among the one or more NUMA nodes.

18. The non-transitory computer-readable medium of claim 15, wherein to migrate the container from the source NUMA node to the target NUMA node is to:
   initiate execution of the container by the target NUMA node; and
   terminate execution of the container on the source NUMA node.

\* \* \* \* \*